United States Patent
Yang et al.

(10) Patent No.: US 6,190,483 B1
(45) Date of Patent: Feb. 20, 2001

(54) METHOD FOR MAKING AN OPTICAL CONDUCTOR

(75) Inventors: Michaël Yang, Conover; Christopher McNutt, Hickory, both of NC (US); David Benzel, Calais (FR)

(73) Assignee: Alcatel, Paris (FR)

( * ) Notice: Under 35 U.S.C. 154(b), the term of this patent shall be extended for 0 days.

(21) Appl. No.: 09/242,760

(22) PCT Filed: Jun. 22, 1998

(86) PCT No.: PCT/FR98/01301

§ 371 Date: Feb. 18, 1999

§ 102(e) Date: Feb. 18, 1999

(87) PCT Pub. No.: WO99/00337

PCT Pub. Date: Jan. 7, 1999

(30) Foreign Application Priority Data

Jun. 26, 1997 (FR) .................................................. 97 08012

(51) Int. Cl.⁷ ............................... B32B 31/28; C08J 03/28
(52) U.S. Cl. .................. 156/180; 156/257.5; 156/275.7; 427/493; 427/508; 427/513; 427/163.2
(58) Field of Search ............................... 156/180, 275.5, 156/275.7; 427/513, 508, 493, 163.2; 385/123, 128, 114

(56) References Cited

U.S. PATENT DOCUMENTS

| | | | |
|---|---|---|---|
| 4,636,405 | * 1/1987 | Mensah et al. | 427/493 |
| 5,015,068 | * 5/1991 | Petisce | 385/123 |
| 5,891,530 | * 4/1999 | Wright | 427/515 |
| 5,993,896 | * 11/1999 | Unterberger et al. | 427/117 |
| 6,018,605 | * 1/2000 | Mills et al. | 385/114 |

FOREIGN PATENT DOCUMENTS

| | | |
|---|---|---|
| 0 440 1787 A1 | 8/1991 | (EP). |
| 0 646 552 A2 | 4/1995 | (EP). |
| 2 155 357 | 9/1985 | (GB). |

OTHER PUBLICATIONS

Patent Abstracts of Japan, vol. 013, No. 293 (C–615), Jul. 6, 1989 corresponding to JP 01 087536 A (Sumitomo Electric Ind, Ltd) Mar. 31, 1989.

Database WPI, Section CH, Week 8909, Derwent Publications Ltd., London, GB; Class 182, AN 89–065968 corresponding to JP 01 018 948 A (Sumitomo Electric Ind Co) Jan. 23, 1989.

* cited by examiner

*Primary Examiner*—Michael W. Ball
*Assistant Examiner*—Michael A Tolin
(74) *Attorney, Agent, or Firm*—Sughrue, Mion, Zinn, Macpeak & Seas, PLLC

(57) ABSTRACT

The invention relates to a method of manufacturing an optical conductor, in which method, a mixture of a resin and of a photo-initiator is exposed to UV radiation in order to form, by cross-linking, the covering of the optical conductor. The cross-linking takes place by causing the conductor (10) to advance past a UV source at a speed of at least 10 meters per minute (m/min). The invention provides a first source (18) which emits monochromatic UV radiation to achieve cross-linking mainly on the surface, and a second UV source which emits UV radiation of broad spectrum containing wavelengths that are longer than the wavelength of the monochromatic source to achieve cross-linking mainly in depth.

11 Claims, 1 Drawing Sheet

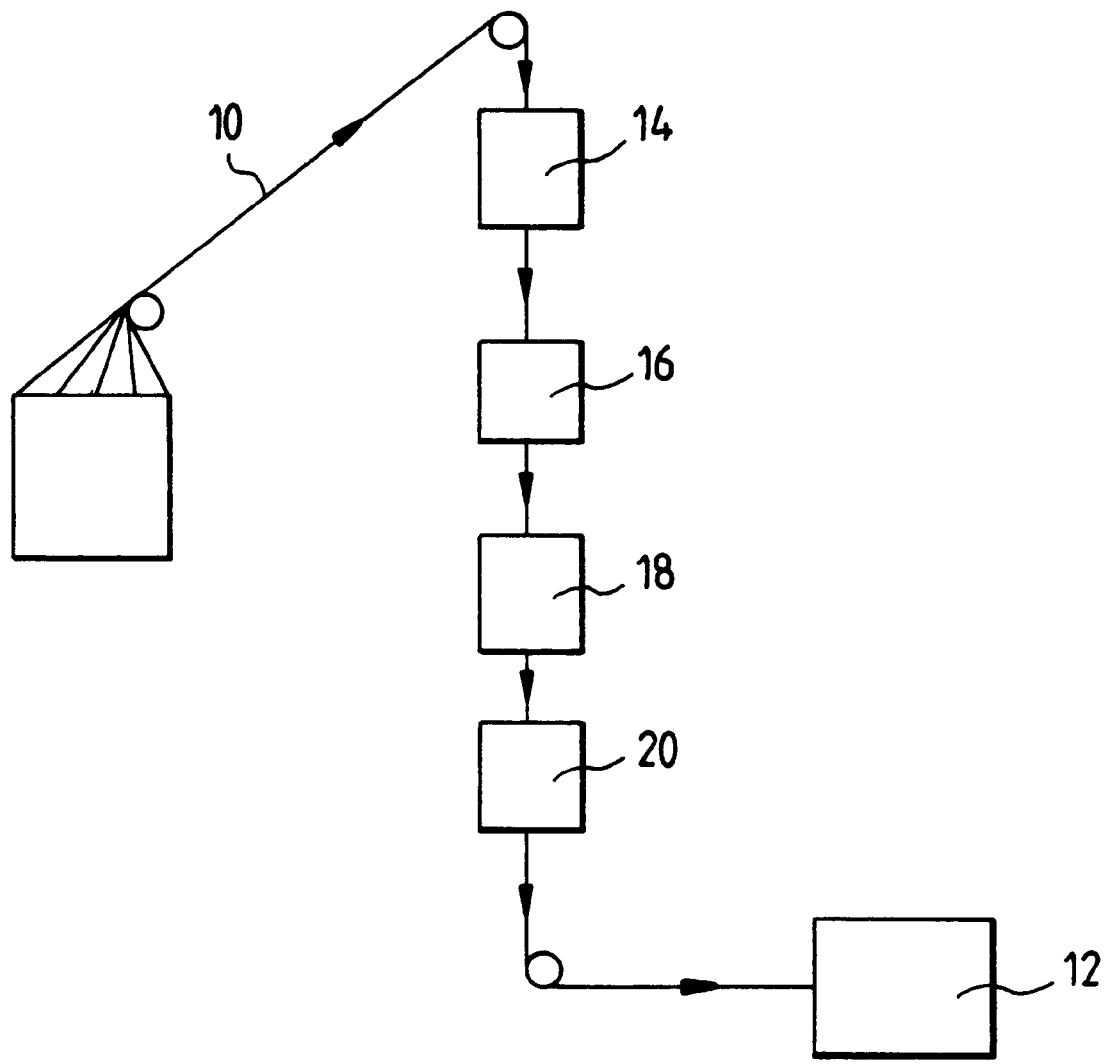

METHOD FOR MAKING AN OPTICAL CONDUCTOR

BACKGROUND OF THE INVENTION

The invention relates to a method of manufacturing an optical conductor. It relates more particularly to setting the coverings on optical fibers by exposing them to ultraviolet radiation.

An optical conductor for conveying data comprises a glass fiber having a diameter of about one hundred microns, typically of 125 μm, and at least one protective covering generally made up of two insulating layers. The protective covering is itself covered with a coloring layer for fiber coding or recognition purposes. The outside diameter of such a conductor lies in the range 245 μm to 250 μm.

A plurality of optical conductors can be associated in parallel to form a ribbon. In which case, coating is provided to hold the conductors together.

The coverings and the coating are made of polymers that can be cured (i.e. cross-linked) by exposing them to ultraviolet radiation.

In practice, to make the covering of a conductor, the fibers are surrounded in a layer of liquid polymer, and that material is solidified by being exposed to ultraviolet radiation. The two protective layers can be manufactured either serially, i.e. the first layer is manufactured prior to the second layer, or else in parallel, with both layers being deposited simultaneously and being cured together. Currently, the coloring layer and the coating covering (for forming a ribbon) are manufactured serially, one after the other.

To achieve the cross-linking, photo-initiator elements are inserted into the material to be polymerized. By means of the photo-initiators, curing by exposure to ultraviolet radiation causes a chemical polymerization reaction to take place, thereby setting the material. For example, the material to be polymerized can be an acrylate.

Curing by exposure to ultraviolet radiation is generally performed by means of two arc lamps. A first lamp produces radiation, the most intense wavelengths of which lie approximately in the range 350 nm to 400 nm. The first lamp principally performs in-depth cross-linking. A second arc lamp emits ultraviolet radiation that is rich in shorter wavelengths, of about 300 nm. The second lamp principally performs surface cross-linking.

The arc lamps give off large quantities of heat. It is thus necessary to cool them. It is also necessary to cool the optical conductor being manufactured because, at the end of the first exposure to ultraviolet radiation, the temperature of the covering is high and lies in the range 100° C. to 1000° C., and cross-linking does not take place correctly at high temperatures. Unfortunately, the reduction in temperature that can be obtained is relatively small, in particular because optical conductors must be manufactured at high speed, and often at speeds exceeding 100 meters per minute (m/min). Under such conditions, the quantity of photo-initiator material that needs to be used is greater than the quantity that would be necessary if the temperature were close to ambient.

SUMMARY OF THE INVENTION

The invention remedies the above drawbacks.

The method of the invention is characterized in that, to cross-link an optical conductor covering advancing at a speed of at least 10 meters per minute (m/min), and preferably higher than 100 m/min, a monochromatic or quasi-monochromatic UV radiation source such as a laser or an excimer lamp is provided that emits UV radiation making it possible to achieve cross-linking mainly on the surface, and an arc lamp is provided that makes it possible to achieve cross-linking mainly in depth.

Preferably, the monochromatic or quasi-monochromatic source precedes the arc lamp.

After exposure to the monochromatic or quasi-monochromatic UV radiation, the temperature of the cross-linked product is not significantly different from ambient temperature. It is therefore not necessary to provide cooling means. In addition, the cross-linking is significantly more effective because the product is at a temperature that is optimal for such cross-linking.

It should be noted that it has already been proposed to use a monochromatic or quasi-monochromatic source for cross-linking. But, it has been observed that use of such a monochromatic source does not, on its own, achieve complete cross-linking.

Thus, the invention, which relates to the combined use of a monochromatic or quasi-monochromatic source and of an arc lamp, makes it possible to achieve complete cross-linking with a minimum amount of photo-initiator material. In addition, the method does not give rise to any significant complication of the manufacturing installation.

Furthermore, it has been observed that better results are obtained by providing, upstream from the arc lamp, two monochromatic or quasi-monochromatic sources having different wavelengths to achieve the surface cross-linking. The second monochromatic source contributes to the cross-linking in depth, and the arc lamp finishes off this in-depth cross-linking.

BRIEF DESCRIPTION OF THE DRAWINGS

Other characteristics and advantages of the invention appear from the following description of some of its implementations given with reference to the sole FIGURE which is a diagram of an installation of the invention.

DETAILED DESCRIPTION OF THE INVENTION

Most of the installation shown in the sole FIGURE is as in a conventional installation for manufacturing optical conductors or ribbons.

The installation includes drive means for driving the fibers 10 or bundles of fibers at a speed in the range 100 m/min to 300 m/min towards apparatus 12 for receiving the manufactured conductors or ribbons.

Upstream from the apparatus 12, firstly there is a station 14 for applying resin to the fibers or ribbons.

In the invention, downstream from the station 14, a first curing station 16 is provided for curing by exposure to ultraviolet radiation, the first curing station having an excimer lamp whose wavelength is 222 nm. With radiation at this wavelength, partial cross-linking is achieved both in depth and on the surface.

After the station 16, a curing station 18 is provided for curing by exposure to monochromatic UV radiation. This station has an excimer lamp whose wavelength is 308 nm. The station 18 finishes off the surface cross-linking that is achieved by the station 16.

After the lamp 18, there is a station 20 which has an arc lamp emitting UV wavelengths that are longer than those emitted by the excimer lamps. This arc lamp makes it possible to finish off the cross-linking in depth.

The excimer lamps of the stations 16 and 18 are low-temperature lamps of the tubular type. The fibers as coated with resin are displaced through the tubes along their axes which normally coincide.

In this example, the lamp of the station 20 is medium-pressure mercury vapor lamp.

The resin used is an acrylate, a polyurethane, an oligomer, or a monomer.

For more details about the resin used, reference may be made, for example, to Patent Document U.S. Pat. No. 4,844,604.

Although the method described applies to all resins and to all photo-initiators commonly used for manufacturing optical conductors or ribbons, it is preferable to select the materials to obtain an optimum result. The term "optimum result" is used to mean that cross-linking is complete, or almost complete, after a single pass through the installation shown in the FIGURE.

In particular, the photo-initiators are chosen such that they have maximum effectiveness at the wavelengths of the excimer lamps used.

More precisely, the photo-initiator should have an extinction coefficient of $10^4$ or higher at the wavelength(s) of the excimer lamp(s).

In a manner known per se, the extinction coefficient is calculated in a methanol solution MeOH at ambient temperature. It is expressed in $ml.gr^{-1}.cm^{-1}$.

If an excimer lamp is used that emits ultraviolet radiation at 308 nm, it can be observed that the photo-initiators sold by CIBA-GEIGY under the references Irgacure 369 and Irgacure 907 have suitable extinction coefficients. In particular, the photo-initiator Irgacure 907 has an extinction coefficient of $1.4 \times 10^5$ at 308 nm, while the photo-initiator Irgacure 369 has an extinction coefficient of $4.3 \times 10^4$ at the same wavelength.

Furthermore, the photo-initiator must have sufficient solubility (higher than 3%) in the resin used, naturally before it is cross-linked.

For example, the material chosen for the resin may be a material containing, in percentage by weight, urethane acrylate in the range 30% to 98%, acrylate monomer in the range 0.2% to 40%, photo-initiator in the range 0.05% to 10%, and stabilizer in the range 0.05% to 10%. The solubility of the photo-initiator is determined by adding it while in the solid state to the acrylate monomer while in the liquid state. The solubility is measured after mixing and heating in a bath of hot water at a temperature lying in the range 50° C. to 60° C., then cooling to ambient temperature over 24 hours.

Although it is mentioned above that it is necessary to use an arc lamp to perform in-depth cross-linking, it is to be understood that, with excimer lamps, in-depth cross-linking is not complete, but naturally it is not zero either. The in-depth cross-linking also depends on the photo-initiator used. In particular, with the Irgacure 369 photo-initiator, better in-depth cross-linking is obtained than with the Irgacure 907 photo-initiator.

During trials performed in the context of the invention, it was observed that the best results were obtained with, as the resin, the product sold by DSM and bearing the reference C932, and, as the photo-initiator, the materials mentioned above, namely the products Irgacure 369 and 907 sold by CIBA-GEIGY.

It should also be noted that, with the method of the invention, and preferably with the resins and photo-initiators mentioned above, good cross-linking is obtained even with resins containing pigments based on titanium oxide $TiO_2$ which is generally present in pigments of the following colors: white, grey, yellow, and orange; such pigments being known to absorb UV radiation, and to make cross-linking more difficult.

What is claimed is:

1. A method of manufacturing an optical conductor or a ribbon of optical conductors, said method comprising the step of exposing a mixture of a resin and of a photo-initiator to ultraviolet (UV) radiation in order to form, by cross linking, a covering of the optical conductor or a material for assembling together a plurality of conductors, cross-linking taking place by causing the conductor or bundle of conductors to advance past an ultraviolet source at a speed of at least 10 meters per minute (m/min);

wherein said method comprises exposing said mixture to UV radiation from a first source emitting substantially monochromatic UV radiation to achieve cross-linking mainly on the surface, and then exposing said mixture to UV radiation from a second UV source emitting UV radiation of broad spectrum containing wavelengths that are longer than the wavelength of the monochromatic source to achieve cross-linking mainly in depth.

2. A method according to claim 1, characterized in that the exposure to the substantially monochromatic or UV radiation is performed prior to the exposure to the broad-spectrum UV radiation.

3. A method according to claim 1, characterized in that a low temperature excimer lamp is used for the substantially monochromatic UV source.

4. A method according to claim 3, characterized in that a tubular-type excimer lamp is used through which the conductor or ribbon to be cross-linked advances.

5. A method according to claim 1 characterized in that the wavelength of the substantially monochromatic source is about 308 nm or 222 nm.

6. A method according to claim 1 characterized in that two substantially monochromatic sources are used one after the other.

7. A method according to claim 1 characterized in that an arc lamp is used as the broad-spectrum ultraviolet source performing mainly the cross-linking in depth.

8. A method according to claim 7, characterized in that the arc lamp is a low-pressure mercury vapor lamp.

9. A method according to claim 2, characterized in that the exposure to the broad-spectrum ultraviolet radiation is performed without cooling the conductor or bundle of conductors being manufactured.

10. A method according to claim 1, characterized in that the speed of advance of the conductor or ribbon to be manufactured is at least about 100 m/min.

11. A method according to claim 10, characterized in that the speed of advance of a conductor is about 300 m/min.

* * * * *